United States Patent
Sahinoglu et al.

(10) Patent No.: US 7,792,091 B2
(45) Date of Patent: Sep. 7, 2010

(54) METHOD FOR TRANSMITTING A COMMUNICATIONS PACKET IN A WIRELESS COMMUNICATIONS NETWORK

(75) Inventors: Zafer Sahinoglu, Watertown, MA (US); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1078 days.

(21) Appl. No.: 11/475,264

(22) Filed: Jun. 27, 2006

(65) Prior Publication Data

US 2007/0274260 A1    Nov. 29, 2007

Related U.S. Application Data

(60) Provisional application No. 60/808,412, filed on May 25, 2006.

(51) Int. Cl.
*H04J 3/24* (2006.01)
*H04J 3/06* (2006.01)
*H04J 3/00* (2006.01)

(52) U.S. Cl. .................. 370/349; 370/509; 370/503; 370/516

(58) Field of Classification Search .................. 370/349, 370/509, 503, 516
See application file for complete search history.

(56) References Cited

U.S. PATENT DOCUMENTS 7,161,955 B1 * 1/2007 Zeng et al. ............. 370/466
2005/0147079 A1   7/2005 Lakkis

OTHER PUBLICATIONS

IEEE Draft P802.15.4a/D2, Apr. 2006.
Molisch: "UWB for Sensor Network", Mar. 10, 2006.

* cited by examiner

*Primary Examiner*—Vincent P Harper
*Assistant Examiner*—Omoniyi A Obayanju
(74) *Attorney, Agent, or Firm*—Dirk Brinkman; Gene Vinokur

(57) ABSTRACT

A method and apparatus for transmitting a packet in a wireless communications network is presented. A packet is constructed to include synchronization header, a physical layer header, and a payload. A preamble and a start of frame delimiter is inserted in the synchronization header. Multiple pairs of cores and of suffixes are inserted in the start of frame delimiter, and then the packet is transmitted.

12 Claims, 5 Drawing Sheets

Fig. 1
Prior Art

METHOD FOR TRANSMITTING A COMMUNICATIONS PACKET IN A WIRELESS COMMUNICATIONS NETWORK

RELATED APPLICATION

This application claims priority to U.S. Provisional Application No. 60/808,412, "Preamble Design for Improved Synchronization," filed on May 25, 2006 by Sahinoglu et al.

FIELD OF THE INVENTION

The present invention relates generally to wireless communications, and more particularly to preambles in communication packets.

BACKGROUND OF THE INVENTION

As shown in FIG. 2, a typically prior art wireless packet 200 includes of a synchronization header (SHR) 210, a physical layer header (PHR) 220, and a payload 230 of data. The SHR 210 contains a preamble 240 and start of frame delimiter (SFD) 250.

The SHR is used to achieve signal acquisition, signal synchronization and ranging. The SFD 250 is used to detect the end of the preamble 240, the end of the SHR header 210, and the start of the PHR 220. That is, the SFD 250 serves as a delimiter between the SHR and the PHR.

The Task Group for the emerging IEEE 802.15.4a standard for an alternative physical layer is standardizing the structure of the preamble 240 and the SFD 250. According to the IEEE Draft P802.15.4a/D2, April, 2006, incorporated herein by reference, the preamble 240 has repetitions (S1-S8) of eight selected length 31 ternary symbols (Si) 110, as shown in FIG. 1

As shown in FIG. 3, the ternary symbols (Si) 110 can be a pulse with positive (+) polarity 320, a pulse with negative (−) polarity 330, or a pulse with a zero (0) multiplier 340. Each pulse is separated from the next by a pulse repetition interval (PRI) 310. The ternary symbols 110 in FIG. 3 have perfect periodic autocorrelation properties in a sense that side lobes around an autocorrelation peak are zero as shown in FIG. 3 for symbols S1.

FIG. 2 shows the SFD 250 specified in the IEEE Draft P802.15.4a/D2 standard. The SFD also has a periodic structure that includes repetitions of a base pattern X 260. The base pattern X 260 in FIG. 2 is not periodic, but the repetition of the base pattern X 260 within the SFD 250 generates periodicity. The periodicity helps to achieve statistical multiplexing gain from the repetitions.

However, the SFD should have a non-periodic pattern to help the receiver to determine what section of the SFD 250 is being received. Therefore, it is desired to improve the SFD by removing the periodicity without sacrificing the statistical multiplexing gain that is achieved by repetitions of the base pattern X.

SUMMARY OF THE INVENTION

A method and apparatus transmits a packet in a wireless communications network. The transmitted packet includes a synchronization header, a physical layer header, and a payload. The synchronization header includes a preamble and a start of frame delimiter. The start of frame delimiter includes multiple pairs of cores and ternary symbols.

BRIEF DESCRIPTION OF THE DRAWINGS

FIG. 1 is a prior art list of length 31 ternary symbols that have autocorrelation properties;

DETAILED DESCRIPTION OF THE PREFERRED EMBODIMENT

The embodiments of the invention provide a structure for a packet structure in a wireless communications network designed according to an emerging IEEE 802.15.4a standard as described in IEEE Draft P802.15.4a/D2, April, 2006;

IEEE Draft P802.15.4a/D2, incorporated herein by reference in its entirety.

Figure 2:
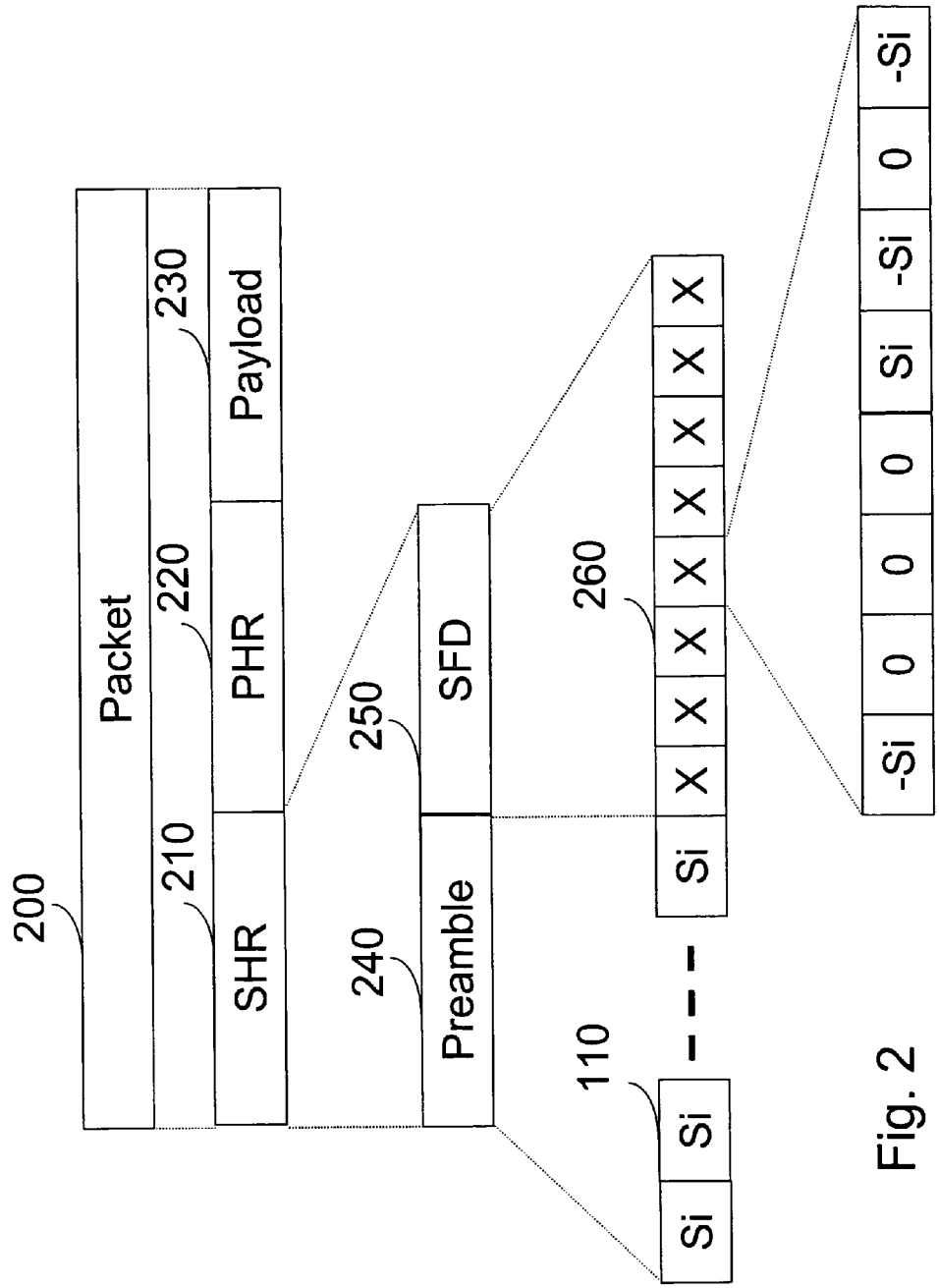
FIG. 2 is a block diagram of a prior art packet structure for a wireless network designed according to an emerging IEEE 802.15.4a standard in IEEE Draft P802.15.4a/D2, April, 2006.
Figure 3:
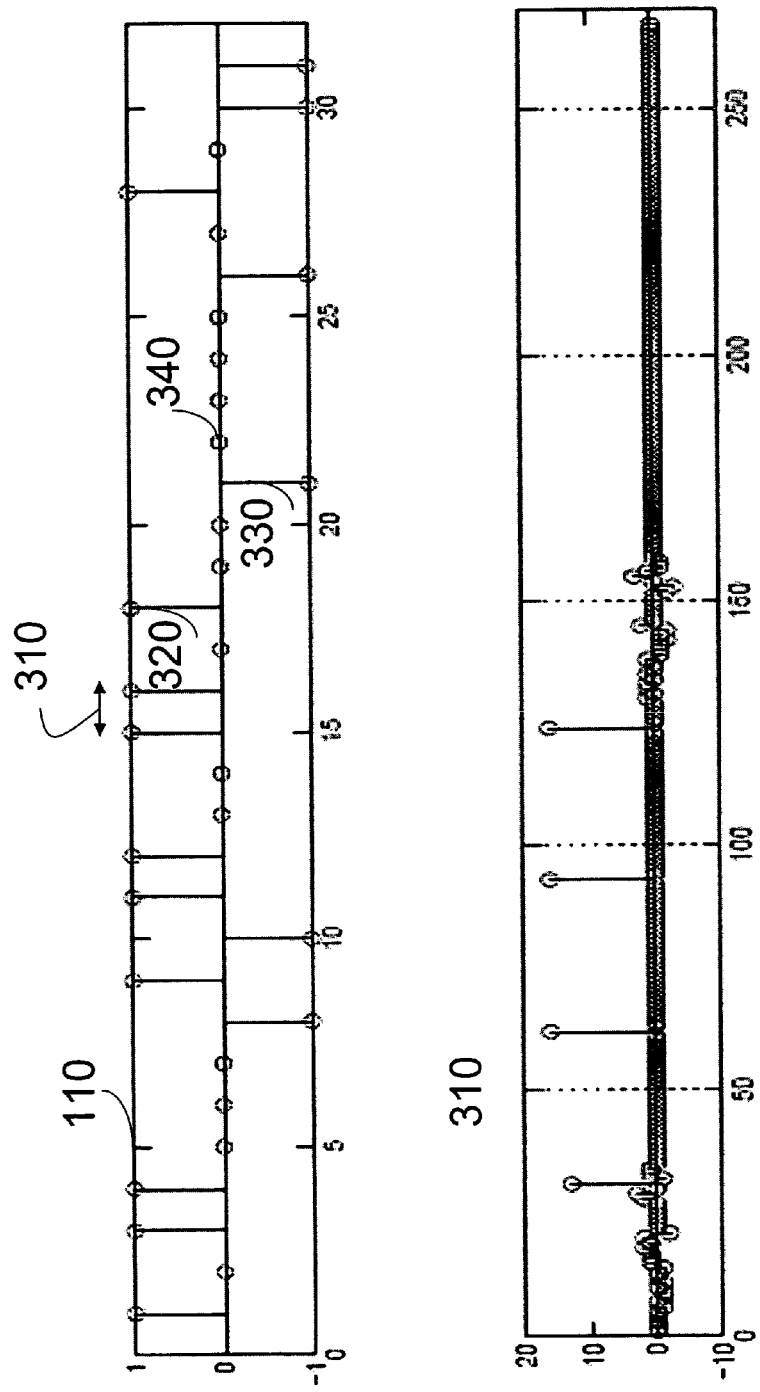
FIG. 3 is a prior art timing diagram of a length-31 ternary symbol with perfect periodic autocorrelation in time domain, and a corresponding autocorrelation function.
Figure 4:
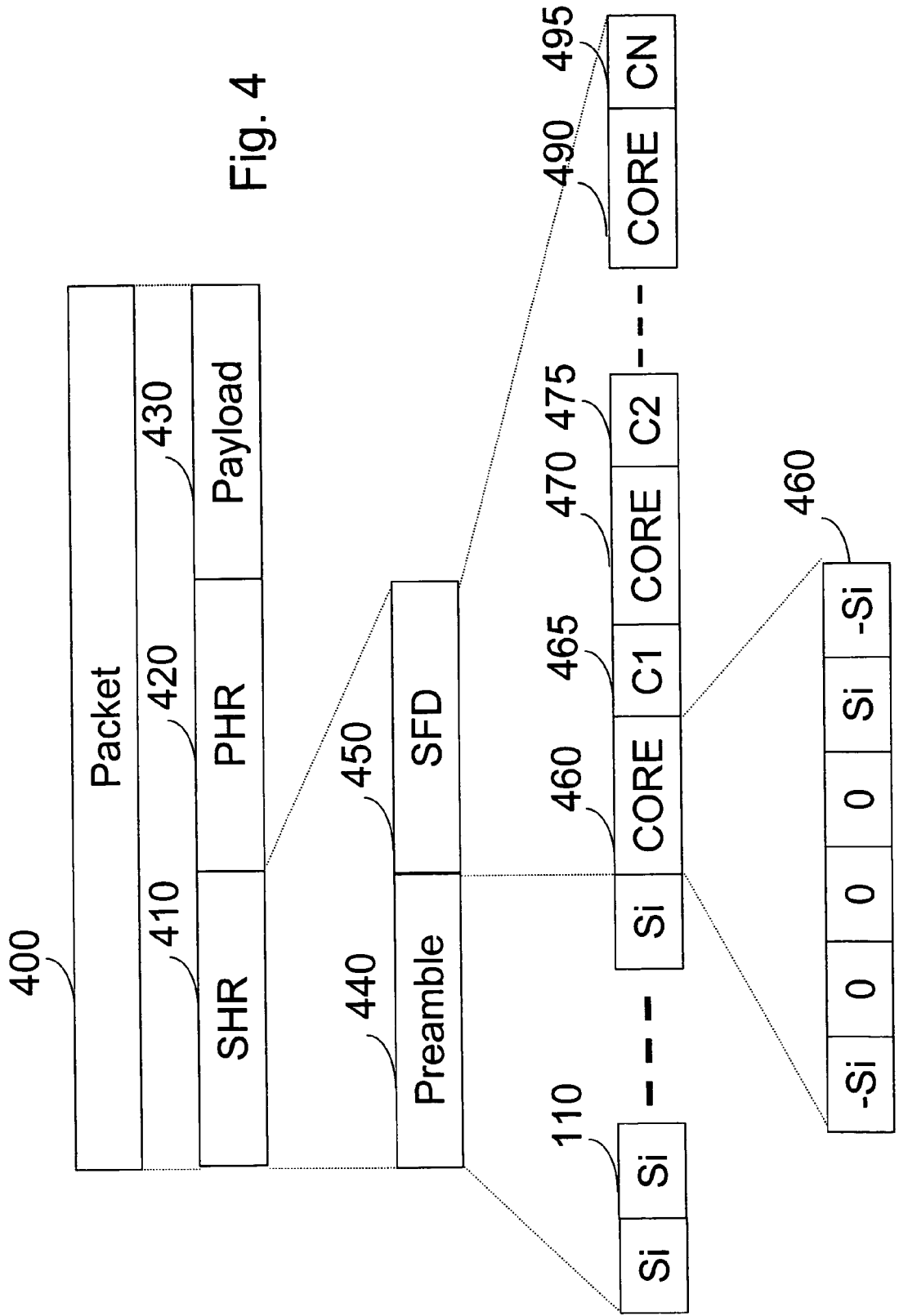
FIG. 4 is a block diagram of a packet structure according to an embodiment of the invention.

As shown in FIG. 4, a packet 400 includes a synchronization header (SHR) 410, a physical layer header (PHR) 420, and a payload 430 of data. The SHR 420 includes a preamble 440 and start of frame delimiter (SFD) 450.

Figure 1:
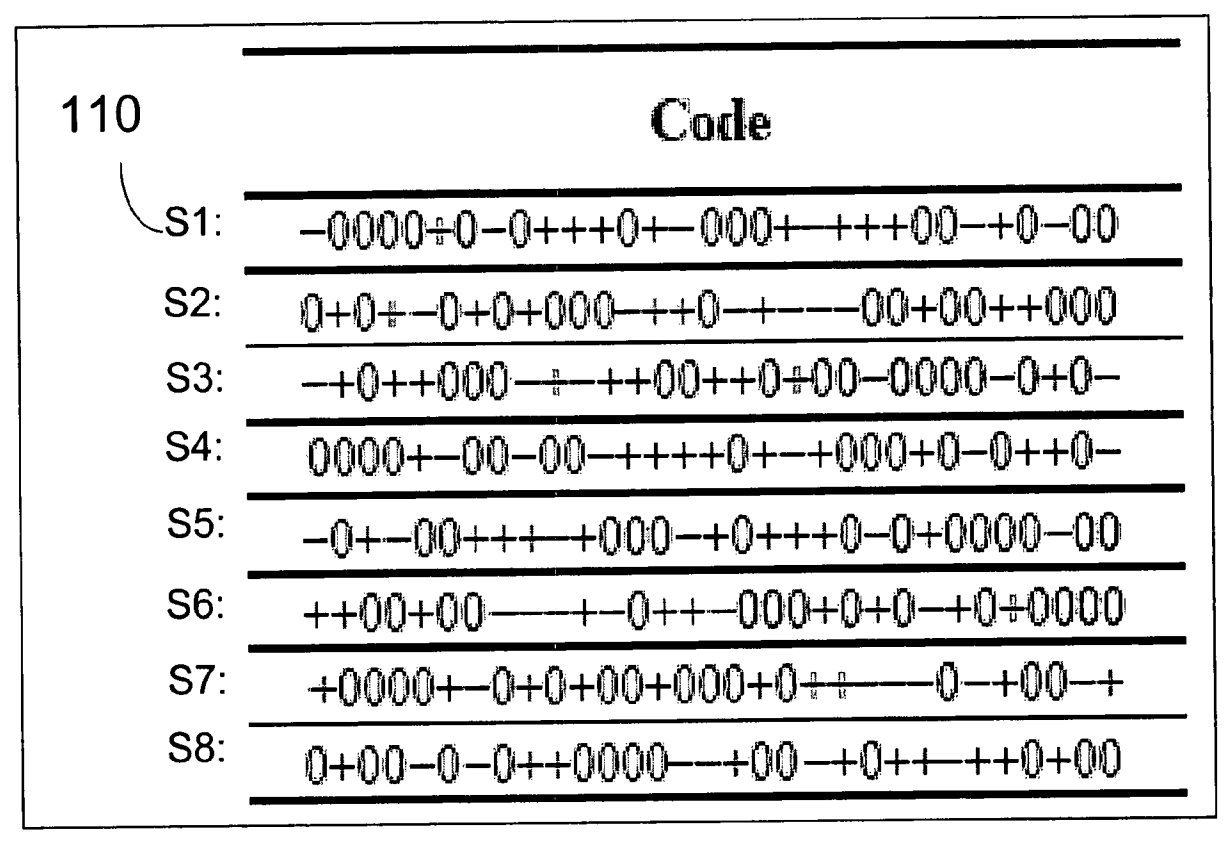

The preamble 440 includes repetitions of ternary symbols Si 110 as shown in FIG. 1.

The SFD structure according to an embodiment of the invention differs from that specified in IEEE Draft P802.15.4a/D2 standard. The SFD 450 includes N repeated pairs of constant cores and varying suffixes, 460 and 465, 470 and 475, 480 and 485, . . . , 490 and 495.

If there are N repetitions of the constant core, then there are N different suffixes.

One structure for the core includes ternary symbols {−Si, 0, 0, 0, Si, −Si}. If N is 4, then four different suffixes can be specified.

Figure 5:
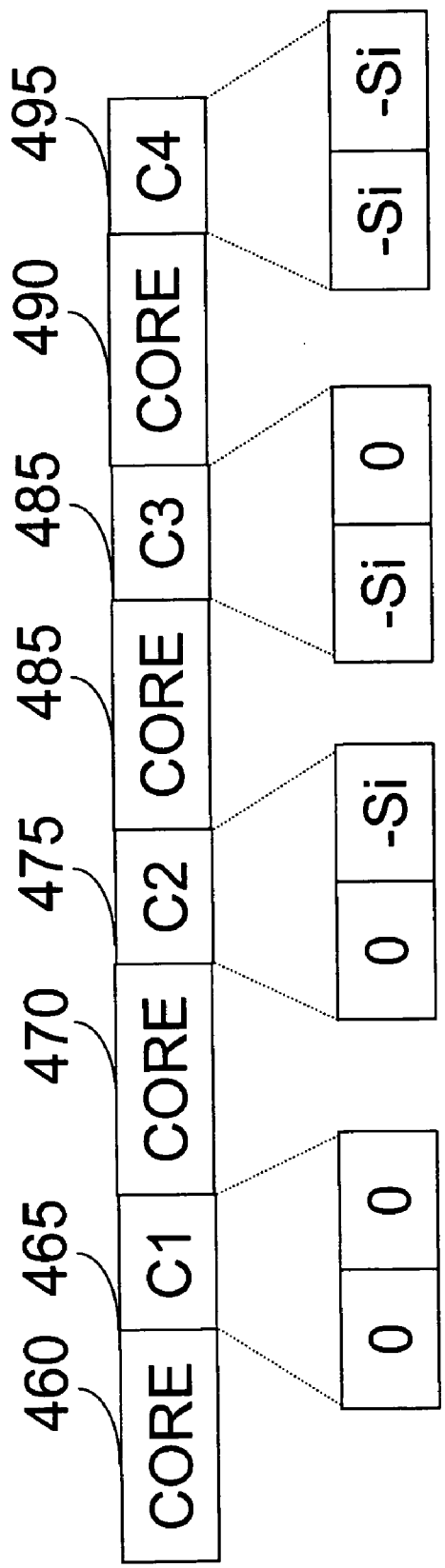
FIG. 5 is detailed block diagram of a start of frame delimiter (SFD) according to an embodiment of the invention.

As shown in FIG. 5, the first suffix can be C1={0, 0} 465, the second suffix C2={0,−Si} 475, the third suffix C3={0−Si} 485, and the fourth suffix C4={Si,−Si} 495.

If each suffix has a different pattern of ternary symbols as described above, then the receiver can determine the number of repetitions received at a given time. This makes it possible to synchronize a clock of the receiver relatively within the SFD 450 without any ambiguity.

Furthermore, the receiver can still obtain statistical multiplexing gain from the repetitions of the constant cores of the SFD 450.

EFFECT OF THE INVENTION

The embodiments of the invention improve synchronization of a receiver to a received packet and improves the detection of the start of frame delimiter (SFD).

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transmitting a packet in a wireless communications network, comprising:
   constructing a packet including synchronization header, a physical layer header, and a payload;
   inserting a preamble and a start of frame delimiter in the synchronization header;
   inserting a plurality of pairs of cores and of suffixes in the start of frame delimiter, wherein there are four pairs, and the ternary symbols in the four suffixes are $\{0, 0\}$, $\{0,-Si\}$, $\{-Si, 0\}$, and $\{Si,-Si\}$; and
   transmitting the packet.

2. The method of claim 1, in which the ternary symbols in each core are constant, and the ternary symbols in each suffix vary.

3. The method of claim 1, in which a receiver determines a number of the pairs of cores and suffixes in each packet.

4. The method of claim 1, further comprising:
   synchronizing a clock of a receiver according the pairs of cores and suffixes.

5. The method of claim 1, in which a receiver obtains a statistical multiplexing gain from the pairs of cores and suffixes.

6. The method of claim 1, in which the network is designed according to an IEEE 802.15.4a standard.

7. An apparatus for transmitting a packet in a wireless communications network, comprising:
   means for constructing a packet including synchronization header, a physical layer header, and a payload;
   means for inserting a preamble and a start of frame delimiter in the synchronization header;
   means for inserting a plurality of pairs of cores and of suffixes in the start of frame delimiter, wherein there are four pairs, and the ternary symbols in the four suffixes are $\{0, 0\}$, $\{0,-Si\}$, $\{-Si, 0\}$, and $\{Si,-Si\}$; and
   means for transmitting the packet.

8. The apparatus of claim 7, in which the ternary symbols in each core are constant, and the ternary symbols in each suffix vary.

9. The apparatus of claim 7, further comprising:
   a receiver configured to determine a number of the pairs of cores and suffixes in each packet.

10. The apparatus of claim 9, further comprising:
    means for synchronizing a clock of the receiver according the pairs of cores and suffixes.

11. The apparatus of claim 9, in which the receiver obtains a statistical multiplexing gain from the pairs of cores and suffixes.

12. The apparatus of claim 7, in which the network is designed according to an IEEE 802.15.4a standard.

* * * * *